United States Patent [19]
Hofmann et al.

[11] Patent Number: 5,779,018
[45] Date of Patent: Jul. 14, 1998

[54] FRICTION CLUTCH WITH CARBON PRESSURE PLATE

[75] Inventors: Klaus Hofmann, Leutershausen; Klaus Betten, Rütschenhausen; Nicole Unrath, Schweinfurt; Horst Friedrich, Happertshausen, all of Germany

[73] Assignee: Mannesmann Sachs AG, Schweinfurt, Germany

[21] Appl. No.: 762,409

[22] Filed: Dec. 9, 1996

[30] Foreign Application Priority Data

Dec. 9, 1995 [DE] Germany .............. 195 45 972.5

[51] Int. Cl.$^6$ ................................ F16D 13/60
[52] U.S. Cl. .................. 192/70.14; 192/70.27; 192/107 M
[58] Field of Search ............. 192/70.14, 70.27, 192/107 M, 89.23, 109 A

[56] References Cited

U.S. PATENT DOCUMENTS

| | | | |
|---|---|---|---|
| 3,491,865 | 1/1970 | Stockton | 192/70.14 |
| 4,846,326 | 7/1989 | Tilton et al. | |
| 5,598,910 | 2/1997 | Moroto et al. | 192/70.14 X |
| 5,617,941 | 4/1997 | Takahashi et al. | 192/70.14 X |

FOREIGN PATENT DOCUMENTS

| | | |
|---|---|---|
| 1948990 | 4/1965 | Germany . |
| 1475334 | 5/1969 | Germany . |
| 2357082 | 5/1974 | Germany . |
| 6610565 | 9/1974 | Germany . |
| 3542847 | 6/1987 | Germany . |
| 9404838 | 3/1994 | WIPO . |

*Primary Examiner*—Charles A. Marmor
*Assistant Examiner*—Saúl J. Rodriguez
*Attorney, Agent, or Firm*—Cohen, Pontani, Lieberman & Pavane

[57] ABSTRACT

A friction clutch, preferably a multi-plate clutch, in which the pressure plate is made of carbon material and has a wear-resistant surface coating and/or an inserted wire ring in the contact area for the diaphragm spring.

7 Claims, 3 Drawing Sheets

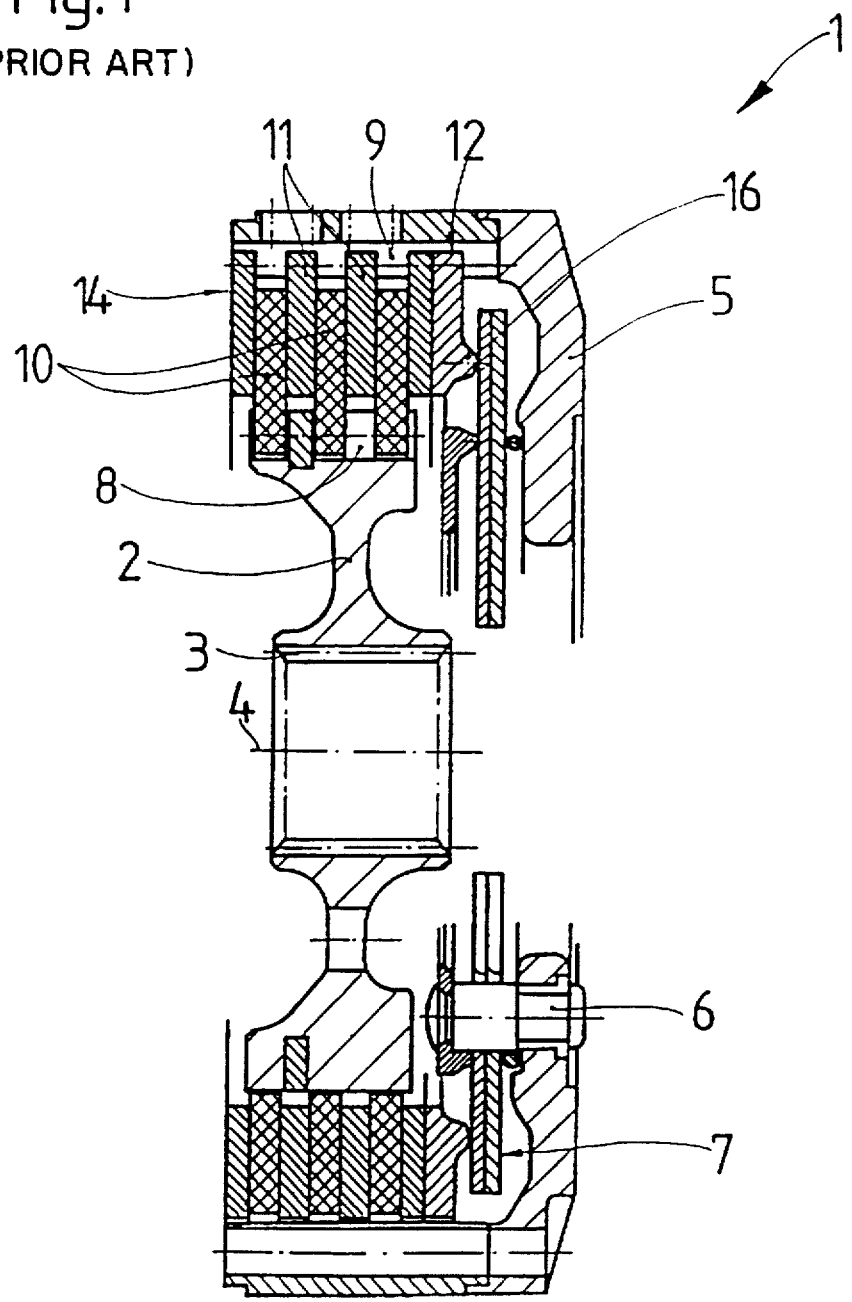

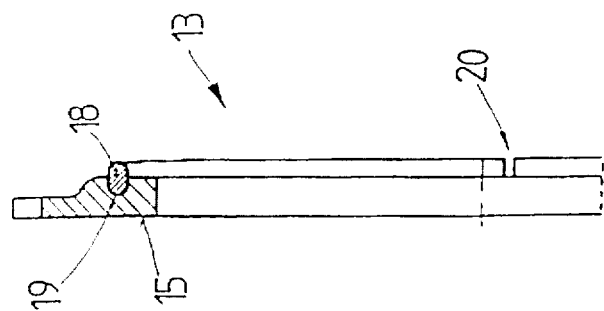
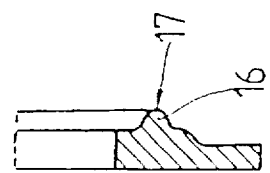
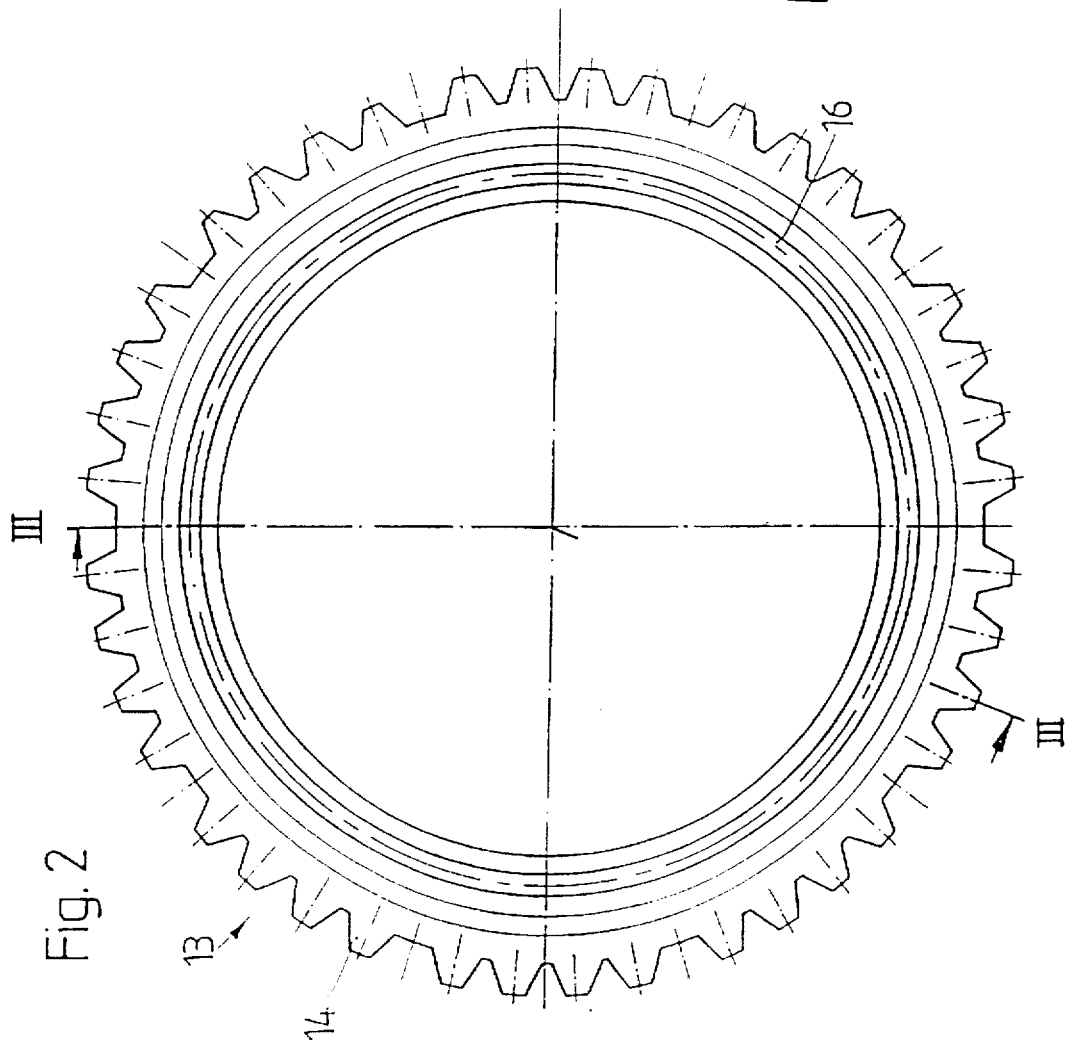

FRICTION CLUTCH WITH CARBON PRESSURE PLATE

BACKGROUND OF THE INVENTION

1. Field of the Invention

The invention relates to a friction clutch especially a multi-plate friction clutch. Such a clutch has a hub with internal teeth for being mounted in turn-proof fashion on a transmission shaft that defines a rotational axis, a friction element arranged in turnproof fashion on the hub, a clutch housing, and a pressure plate. The pressure plate is arranged in the clutch housing in turn-proof but axially movable fashion and can be subjected to force by a diaphragm spring. The pressure plate, with interconnection of the friction element, can press against the counterpressure plate carrying the clutch housing.

2. Description of the Prior Art

A friction clutch of the above type is known, for example, from U.S. Pat. No. 4,846,326. In the known friction clutch, which is intended for sports use, inner plates are connected in turn-proof fashion to a hub and outer plates are connected in turn-proof fashion to the clutch housing. The plates consist of carbon material. The pressure plate is made of metal in the form of a separate component and is combined with an outer plate.

Furthermore, it is known from the German Offenlegungsschrift 2 357 082, to compensate for changes in mass caused by wear in diaphragm spring clutches by arranging wire rings between the diaphragm spring and the pressure plate, so as to achieve a wear balance. Finally, it is known from German Utility Patent 19 48 990 to make pressure plates of aluminum. These plates have a metal coating on their surface facing the friction element and a wire ring at the location of contact facing the diaphragm spring.

SUMMARY OF THE INVENTION

Accordingly, it is an object of the present invention to improve a friction clutch, especially of the multi-plate type, in the region of the pressure plate, so that flawless function is ensured despite high thermal stress.

Pursuant to this object, and others which will become apparent hereafter, one aspect of the present invention resides in a friction clutch comprised of a clutch housing mountable on a counterpressure plate, and a hub with internal teeth arranged in the clutch housing so as to be mountable in a turn-proof fashion on a transmission shaft, which defines a rotational axis. A friction element is arranged on the hub in a turn-proof fashion. A pressure plate is arranged in the clutch housing also in turn-proof fashion but is also axially movable. A diaphragm spring is arranged to subject the pressure plate to a force so that the pressure plate, with interconnection of the friction element, is pressable against the counterpressure plate carrying the clutch housing. The pressure plate is made of a carbon material and has a friction surface for direct contact with a friction surface of the friction element. The pressure plate further has a seating bulge for engagement with the diaphragm spring. The seating bulge is arranged on a side of the pressure plate opposite to the friction surface so as to be concentric to the rotational axis. The seating bulge is reinforced, at least in an area making contact with the diaphragm spring means, by a wear resistant material.

Manufacturing the pressure plate of carbon material and reinforcing the diaphragm spring support location by applying a wear-resistant material allows significant improvement to be achieved in the function of the friction clutch. For example, the problems of heat deformation in the metal part of the pressure plate that occur in the prior art and the associated tendency to jam in the region of the toothing for torque drive relative to the housing are avoided. The construction according to the present invention makes it possible to provide the carbon material, which remains free of deformation even at high temperatures, with only slight play in its torque toothing, because no tendency to jam exists even under high thermal stress.

In a further embodiment of the invention the seating bulge is coated with silicon-carbide (SiC). Coating the seating bulge with silicon-carbide prevents premature wear at the location of contact between the pressure plate and the diaphragm spring and thus deters crumbling of the carbon material. Silicon-carbide is especially well suited for coating the seating bulge, because it forms a hard and wear-resistant surface that can be smoothed after application by an abrasive treatment as needed.

However, the seating bulge can also be formed by a metal wire ring that is placed into an encircling groove of the pressure plate. Such a wire ring is easy to manufacture and can be given the desired surface shape during production. The wire ring is open in respect to circumference, and the two wire ends have a minimum distance from one another. This makes it possible to compensate under high thermal stress for the differences in heat expansion between the carbon material, on the one hand, and the metal ring, on the other.

In another embodiment of the invention, the wire ends of the wire ring are bevelled on the side facing the pressure plate. This bevelling allows the wire ring to move freely in the groove and thus to expand and then contract again.

Advantageously, the wire ring has a roughly rectangular cross-section, with a radially outer and radially inner cylindrical wall area, to which are attached round-offs directed in the axial direction. This shape, in conjunction with a corresponding shape in the pressure plate, is especially advantageous because the wire ring is securely conducted radially via the corresponding cylindrical wall area in the pressure plate even under high centrifugal stresses and when the friction clutch is disengaged.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 is a longitudinal section of a prior art friction clutch;

FIG. 2 is a view of a pressure plate pursuant to the present invention;

FIG. 3a is a section III—III through the pressure plate of FIG. 2, showing a first embodiment of the seating bulge;

FIG. 3b is a section III—III through the pressure plate of FIG. 2, showing a second embodiment of the seating bulge;

DETAILED DESCRIPTION OF THE PREFERRED EMBODIMENTS

Figure 4:
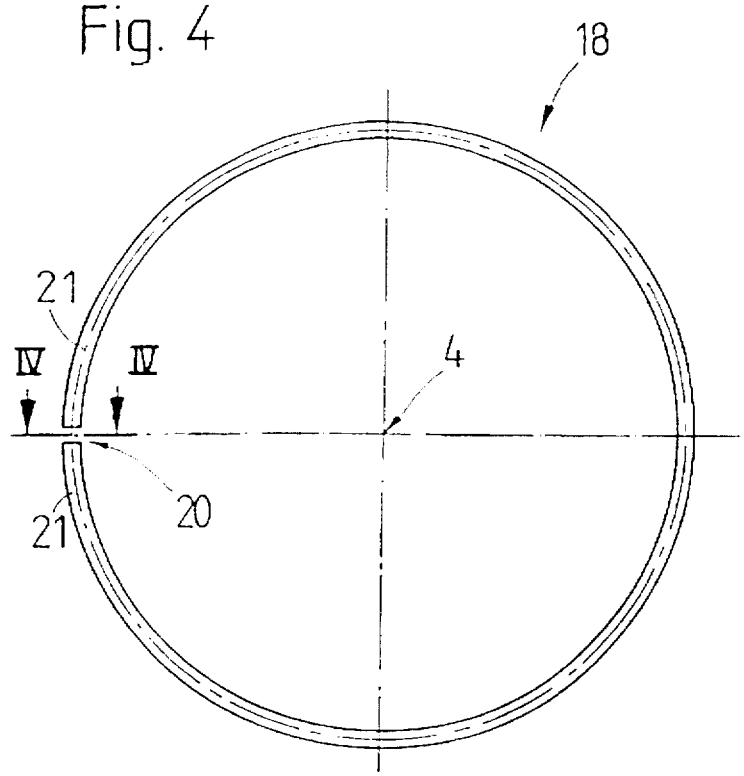
FIG. 4 is a view of the wire ring of FIG. 3.

FIG. 1 shows a section through a multi-plate friction clutch 1. The friction clutch 1 is encompassed by a clutch housing 5, which is screwed onto a counterpressure plate (not shown in greater detail) in the form of a flywheel. Located in the cylindrical part of the clutch housing 5 is an internal toothing 9, in which outer plates 11 are conducted in turn-proof but axially movable manner by a corresponding external toothing 14. Located between the outer plates 11 are inner plates 10, which are also arranged with internal toothing in a turn-proof but axially movable manner on the external toothing 8 of a hub 2. The hub 2 has inner toothing 3 for turn-proof mounting on a transmission shaft (not shown), which defines a rotational axis 4 for all rotating parts. In the area separated from the flywheel, the clutch housing 5 has multiple spacing bolts 6 distributed on the circumference, which represent the tilting circle for a diaphragm spring 7. In the present case, the diaphragm spring 7 comprises two individual diaphragm spring disks. The diaphragm spring 7 is fixed in place in a central area by means of the spacing bolts 6 and, with the interconnection of a pressure plate 12, bears on the first outer plate 11 in order to apply the pressure force for power transmission to the plates 10, 11 and also to make possible the ventilation process, wherein a disengagement system can act on the radially inwardly directed areas of the diaphragm springs 7, causing the diaphragm spring 7 to swing around its central clamping point in such a way that the radially outer area moves away from and releases the plates 10, 11. The pressure plate 12 with the seating bulge 16 for the diaphragm spring 7 is shown in greater detail in FIGS. 2–7.

FIG. 2 shows a view of a pressure plate 13 and FIG. 3 its longitudinal section III—III, pursuant to the present invention. The external toothing 14 can be seen, as can the seating bulge 16. One possible embodiment of the bulge 16 is shown in the longitudinal section III—III (in the upper half).

Figure 6:
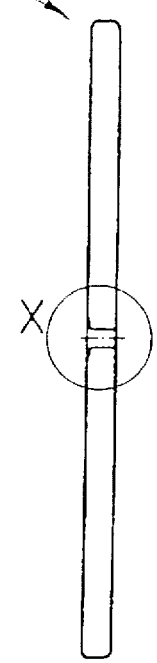
FIG. 6 is a side view of the wire ring of FIG. 4.
Figure 5:
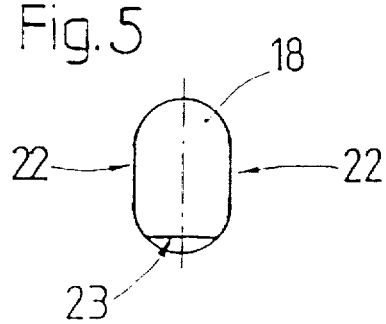
FIG. 5 is a section IV—IV through the wire ring of FIG. 4.
Figure 7:
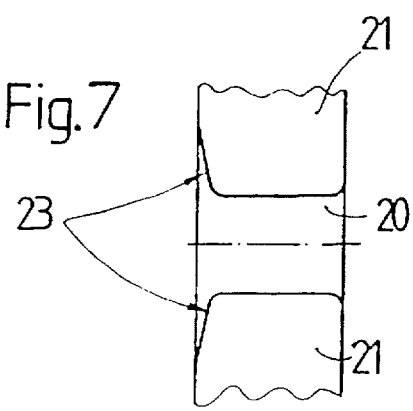
FIG. 7 is an enlarged view of a portion X of FIG. 6.

The pressure plate 13 is made of carbon material and has a friction surface 15, with which the inner plate 10 associated directly therewith can act. In contrast to FIG. 1, the pressure plate here is combined with the corresponding outer plate to form one component. This saves weight as well as space in the axial direction, and there is no danger of distortion of the pressure plate. To absorb the clamping force of the diaphragm spring 7, there is a groove 19 in the pressure plate 13, into which is placed a wire ring 18, which has a gap 20 in the circumferential direction. Details of the embodiment of this wire ring 18 are shown in FIGS. 4–7. FIGS. 4 and 6 show two views of the wire ring 18, namely, a top view and a side view. The wire ring 18 has a gap 20 and the two wire ends 21 are separated from one another by the gap 20 so that no contact can take place between them even under great thermal stress and corresponding expansion of the wire ring 18. The wire ring 18 is roughly oval in cross-section, i.e., it has a radially outer and radially inner cylindrical wall area 22, relative to the rotational axis 4, as shown in FIG. 5. Axially attached to the cylindrical wall areas 22 are round-offs, which can be designed, for example, in semi-circular form. The corresponding groove 19 in the pressure plate 13 also has cylindrical wall areas, so that the wire ring 18 cannot move out of the groove 19 even when the diaphragm spring 7 is in the disengaged position. As Detail X in FIG. 7 shows, the wire ends 21 have bevels 23, which are located on the side of the groove 19, so that during expansion the wire ring can move freely and without resistance relative to the pressure plate 13.

In FIG. 3, the lower half of the Section III—III shows another possible solution for the problem of contact between the diaphragm spring 7 and the pressure plate 13. Here the seating bulge 16 has a coating 17 of silicon-carbide on the side facing the diaphragm spring 7. This coating 17 has a hard surface and prevents the brittle carbon material from being damaged by the contact force of the diaphragm spring 7. Preferably, the silicon-carbide is subjected to treatment after being applied to the surface, for example, by an abrasive process, so that a smooth surface is created.

The described embodiment of a carbon pressure plate is not limited to use in a multi-plate clutch, but can in principle be used in any type of friction clutch.

The invention is not limited by the embodiments described above which are presented as examples only but can be modified in various ways within the scope of protection defined by the appended patent claims.

We claim:

1. A friction clutch, comprising a clutch housing mountable on a counterpressure plate; a hub with internal teeth arranged in the clutch housing so as to be mountable on a transmission shaft, which defines a rotational axis, in turn-proof fashion; a friction element arranged on the hub in turn-proof fashion; a pressure plate arranged in the clutch housing in turn-proof but axially movable fashion; and diaphragm spring means for subjecting the pressure plate to a force so that the pressure plate, with interconnection of the friction element, is pressable against the counterpressure plate carrying the clutch housing, the pressure plate being made of carbon material and having a friction surface for direct contact with a friction surface of the friction element, the pressure plate further having a seating bulge arranged to engage with the diaphragm spring means, the seating bulge being arranged on a side of the pressure plate opposite to the friction surface so as to be concentric to the rotational axis, the seating bulge being reinforced, at least in an area making contact with the diaphragm spring means, by a wear resistant material.

2. A friction clutch as defined in claim 1, wherein the wear resistant material is a coating of silicon-carbide on the seating bulge.

3. A friction clutch as defined in claim 1, wherein the pressure plate has a circumferential groove, and further comprising a metal wire ring arranged in the circumferential groove so as to form the seating bulge.

4. A friction clutch as defined in claim 3, wherein the wire ring has two axial wire ends disposed at a minimum distance from one another.

5. A friction clutch as defined in claim 4, wherein the wire ends are bevelled on a side facing the pressure plate.

6. A friction clutch as defined in claim 3, wherein the wire ring has a roughly rectangular cross-section with a radially outer cylindrical wall area and a radially inner cylindrical wall area that are connected by axially directed round-offs.

7. A friction clutch as defined in claim 6, wherein the groove is configured to conform to the external contour of the wire ring.

* * * * *